Figure 1:
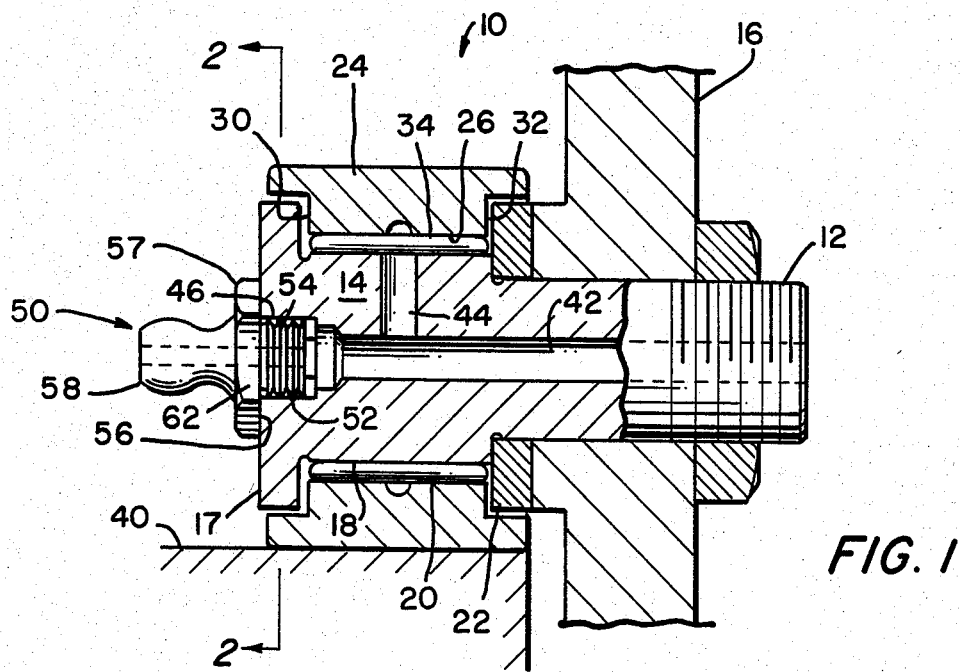

United States Patent [19]

Stella

[11] Patent Number: 4,523,861
[45] Date of Patent: Jun. 18, 1985

[54] BEARING WITH A LUBRICATION FITTING

[75] Inventor: Leo Stella, Bristol, Conn.

[73] Assignee: The Torrington Company, Torrington, Conn.

[21] Appl. No.: 621,783

[22] Filed: Jun. 18, 1984

[51] Int. Cl.³ .............................................. F16C 33/66
[52] U.S. Cl. ..................................... 384/475; 384/380
[58] Field of Search ............... 384/475, 473, 474, 380, 384/381

[56] References Cited

U.S. PATENT DOCUMENTS

| | | | |
|---|---|---|---|
| 2,921,821 | 1/1960 | Reardon | 384/473 |
| 2,944,857 | 7/1960 | Schneider | 384/475 |
| 3,314,735 | 4/1967 | Kocian | 384/475 |
| 4,334,720 | 6/1982 | Signer | 384/475 |

Primary Examiner—Lenard A. Footland
Attorney, Agent, or Firm—Frank S. Troidl

[57] ABSTRACT

A longitudinal lubrication passage and a cross hole in the inner race are used for lubricating rollers in the annular space between the inner race and the outer race. At least a portion of the longitudinal lubrication passage is non-circular. The cylindrical shank of a lubrication fitting is press fit into the non-circular longitudinal lubrication passage portion.

5 Claims, 2 Drawing Figures

U.S. Patent     Jun. 18, 1985     4,523,861

BEARING WITH A LUBRICATION FITTING

This invention relates to bearings. More particularly this invention is a bearing of the track roller or cam follower type which includes a lubrication fitting of a particular structure to permit the lubrication of the rollers and also permit the attachment and removal of the bearing from a bearing support.

In a typical track roller or cam follower type bearing, a longitudinal lubrication hole is often drilled through the stud or inner race member, generally with a cross hole added to provide access to the raceway surface for lubricating the bearing elements. The lubrication holes are provided for the user who may wish to re-lubricate the bearing during its life cycle. If the user needs to re-lubricate the bearing and exclude contaminates, it is necessary to insert a lubrication fitting in one end of the longitudinal lubrication hole and to plug the end opposite the end being lubricated. The lubrication fitting normally has its own internal check valve which keeps the lubricant in the bearing and excludes contaminates while allowing the lubricant to enter.

It is a common practice to provide a hexagonal socket in the head end of the track roller bearing inner member or stud. The hexagonal socket is used to attach the bearing to a threaded hole in a mounting plate or to prevent the stud from turning when a nut is applied to the stud end. When the bearing is provided with a hexagonal socket, the socket is left blind or closed and access for re-lubricating the bearing is only available from the opposite end of the stud. The invention to be described herein includes a lubrication fitting in a hexagonally shaped socket of the stud with the lubrication fitting central bore leading into a lubrication passageway in the stud of the bearing. Thus access for lubricating the bearing is available at both ends of the bearing stud.

The invention to be described herein its particularly useful in a cam follower type bearing and will be described in detail with regard to its use in a cam follower. However, the system can be used in other bearing types which employ lubrication system.

Briefly described the invention includes an inner member and an outer member with a plurality of rolling members located in the annular space between the inner member and the outer member. The inner member has a longitudinal lubrication bore, and a cross-hole extending radially from the longitudinal lubrication bore to the annular space. At least a portion of the longitudinal lubrication passage is non-circular. A lubrication fitting having a cylindrical shank is press fit into the non-circular lubrication passage portion.

Figure 2:
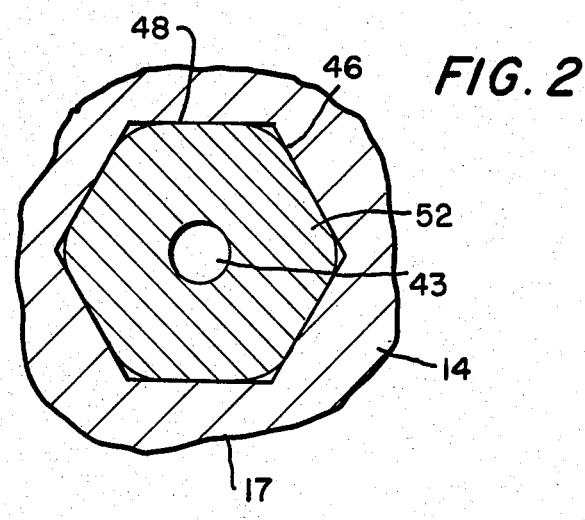

The invention as well as its many advantages may be further understood by reference to the following detailed description and drawings in which:

FIG. 1 is a side view, partly in section, showing a preferred embodiment of the bearing mounted for movement along a bearing support; and FIG. 2 is a sectional view on an enlarged scale taken along lines 2—2 of FIG. 1 and in the direction of the arrows.

In the various figures like parts are referred to by like numbers.

Referring to the drawings and particularly to FIG. 1, the roller bearing cam follower 10 has a threaded portion 12 at one end of the stud or inner race 14 so that the entire bearing may be secured to a suitable arm 16 for transmitting motion. Stud 14 has an integral flange 17 at one end and adjacent this flange there is a bearing surface 18 having a reduced diameter from the outside diameter of the flange 17 and acting as the inner raceway of the bearing. A plurality of rollers 20 are disposed about the stud 14 on the bearing surface 18. The rollers are axially kept in position by the end flange 17 and annular end plate 22.

An outer member 24 has a bore 26 and counter bores 30 and 32 in its axial ends. The raceway 34 of the outer member 24 is positioned lengthwise between the counter bores 30 and 32 and bears upon the rollers 20. When the arm 16 is moved, outer member 24 rotates about the relatively fixed stud 14 as the outer member rolls along the platform 40 of a bearing support.

In accordance with the invention, the inner member 14 is provided with a centrally located longitudinal lubrication passage 42. A cross-hole 44 extends radially from the longitudinal lubrication passage 42 to the rollers 20 contained in the annular space between the inner member 14 and the outer member 24.

At least a portion of the longitudinal passage 42 is non-circular in cross section. In the preferred embodiment of FIG. 1 the non-circular cross sectional portion 46 (see FIG. 2) is hexagonal in cross section. The hexagonal portion consists of six flat surfaces 48 connected together at their ends to form the hexagonal cross sectional portion 46.

The hexagonal portion 46 is preferably located in the head of the inner member or stud 14 at the lubrication passage 42 entrance. A lubrication fitting 50 is placed into the hexagonal portion 46 by a press fit. The lubrication fitting 50 has a shank 52 provided with means for axially retaining the fitting 50 in the longitudinal lubrication passage 42. The retaining means consists of annular projections or serrations 54. Because the lubrication fitting 50 is press fit into the hexagonal portion 46, the serrations 54 tend to bite into the flat surfaces 48 of the hexagonal portion to retain the fitting in the passageway 42 against axial movement. The press fit also deforms the shank 52 of the lubrication fitting 50, as shown in FIG. 2, to approach the shape of the hexagonal portion 46. Thus, the lubrication fitting 50 will not turn with respect to the inner member 14 when a turning torque is applied against the lubrication fitting 50.

When the lubrication fitting 50 is press fit into the longitudinal lubrication passage 42, the longitudinal movement of the shank 52 is limited by contact of the flat surface 56 of a non-circular portion 57 extending radially from the knob 58 of the lubrication fitting 50 with end flange 17. Preferably the radially extending portion 57 is hexagonally shaped and consists of flat surfaces 62 having their ends interconnected to form the hexagonal radially extending portion.

In operation a properly shaped wrench is applied to the hexagonal shaped portion 57 of the lubrication fitting 50 to hold the inner member 14 against rotation as the nut is applied to the threaded end of the inner member 14 or to remove the bearing from the arm 16 when desired. When re-lubrication is desired, all that need be done is to apply the grease through the hole 43 (see FIG. 2) in the lubrication fitting 50.

I claim:

1. A bearing comprising: an inner member; an outer member of greater inside diameter than the outside diameter of the inner member thus providing an annular space between the inner member and the outer member; a plurality of rolling members in the annular space, said inner member having a longitudinal lubrication passage, at least a portion of said longitudinal lubrication passage being non-circular, and a cross-hole extending radially from the longitudinal lubrication passage to the annular space; and a lubrication fitting having a cylindrical shank press fit into said non-circular lubrication passage portion.

2. A bearing in accordance with claim 1 wherein: the lubrication fitting cylindrical shank has projections adapted to axially retain the lubrication fitting in the longitudinal lubrication passage.

3. A bearing in accordance with claim 2 wherein: the projections are annular serrations.

4. A bearing in accordance with claim 3 wherein: the non-circular lubrication passage portion is hexagonal.

5. A bearing in accordance with claim 4 wherein: the hexagonal portion is at the lubrication passage entrance, and the lubrication fitting has a portion extending out from the lubrication passage, such portion having a non-circular outer surface to permit the turning of the inner member by the application of a properly shaped wrench to said non-circular outer surface.

* * * * *